(12) United States Patent
Chaudhari et al.

(10) Patent No.: US 11,643,969 B2
(45) Date of Patent: May 9, 2023

(54) SPLIT CASINGS AND METHODS OF FORMING AND COOLING CASINGS

(71) Applicant: General Electric Company, Schenectady, NY (US)

(72) Inventors: Vinod Shashikant Chaudhari, Bangalore (IN); Bhaskar Nanda Mondal, Bangalore (IN); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/232,259

(22) Filed: Apr. 16, 2021

(65) Prior Publication Data

US 2022/0333528 A1 Oct. 20, 2022

(51) Int. Cl.
*F04D 29/58* (2006.01)
*F02C 7/12* (2006.01)
*F04D 19/00* (2006.01)

(52) U.S. Cl.
CPC ............ *F02C 7/12* (2013.01); *F04D 19/002* (2013.01); *F04D 29/58* (2013.01); *F05D 2220/323* (2013.01); *F05D 2260/20* (2013.01)

(58) Field of Classification Search
CPC .......... F02C 7/12; F04D 19/002; F04D 29/58; F04D 1/063; F04D 17/125; F05D 2220/323; F05D 2260/20; F01D 25/265
See application file for complete search history.

(56) References Cited

U.S. PATENT DOCUMENTS

| | | | |
|---|---|---|---|
| 3,849,023 A * | 11/1974 | Klompas | F01D 9/042 415/173.7 |
| 9,180,010 B2 | 11/2015 | Dong et al. | |
| 9,458,855 B2 | 10/2016 | Dierksmeier et al. | |
| 9,790,810 B2 | 10/2017 | Coutandin et al. | |
| 10,087,778 B2 | 10/2018 | Didion et al. | |
| 10,184,400 B2 | 1/2019 | Cerny et al. | |
| 2004/0141837 A1* | 7/2004 | McMillan | F01D 21/045 415/173.3 |
| 2005/0044685 A1* | 3/2005 | Brooks | F01D 25/243 29/239 |
| 2016/0341214 A1* | 11/2016 | O'Toole | F04D 29/522 |
| 2017/0089264 A1* | 3/2017 | Jones | F01D 25/162 |
| 2017/0268535 A1 | 9/2017 | Mondal et al. | |

(Continued)

*Primary Examiner* — Aaron R Eastman
(74) *Attorney, Agent, or Firm* — Dority & Manning, P.A.

(57) ABSTRACT

Structures, such as compressor casings, for reducing a thermal gradient are provided. For example, a compressor case is split such that it includes first and second case segments. The first case segment extends over a first portion of the compressor case circumference and comprises a first inner structure, a first outer structure, and a first porous structure integrally formed as a monolithic component. The first porous structure is defined between the first inner structure and the first outer structure. The second case segment extends over a second portion of the compressor case circumference and comprises a second inner structure, a second outer structure, and a second porous structure integrally formed as a monolithic component. The second porous structure is defined between the second inner structure and the second outer structure. Methods of cooling structures such as compressor casings also are provided.

19 Claims, 8 Drawing Sheets

(56) References Cited

U.S. PATENT DOCUMENTS

| | | |
|---|---|---|
| 2018/0045073 A1 | 2/2018 | Wiedenhoefer et al. |
| 2018/0058327 A1 | 3/2018 | Tajiri et al. |
| 2018/0313227 A1 | 11/2018 | Wilson et al. |
| 2018/0328673 A1 | 11/2018 | Stoia et al. |
| 2022/0228502 A1* | 7/2022 | Dreano ................ F01D 11/001 |
| 2022/0268211 A1* | 8/2022 | Matsuo .................. F01D 25/12 |

* cited by examiner

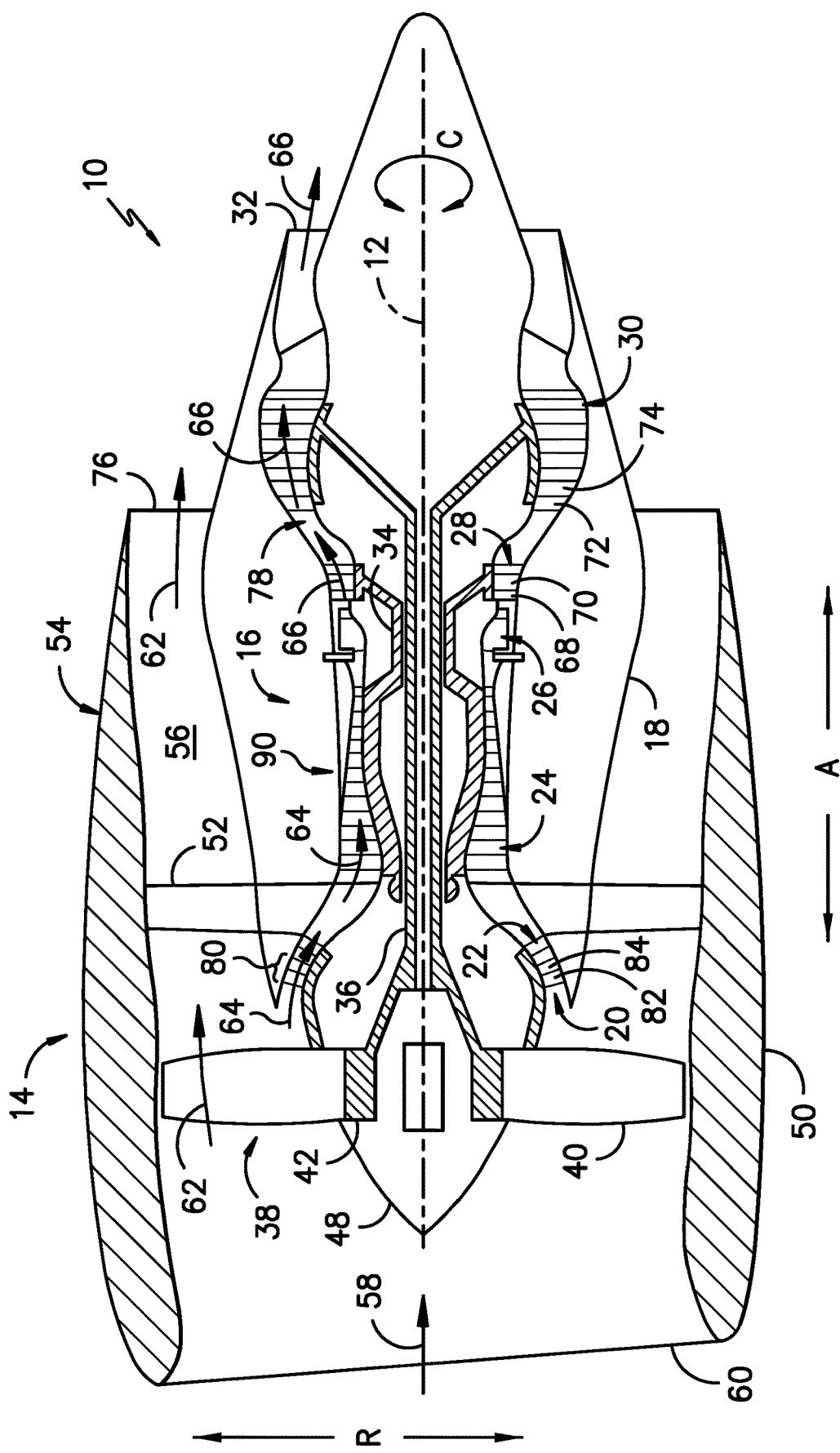

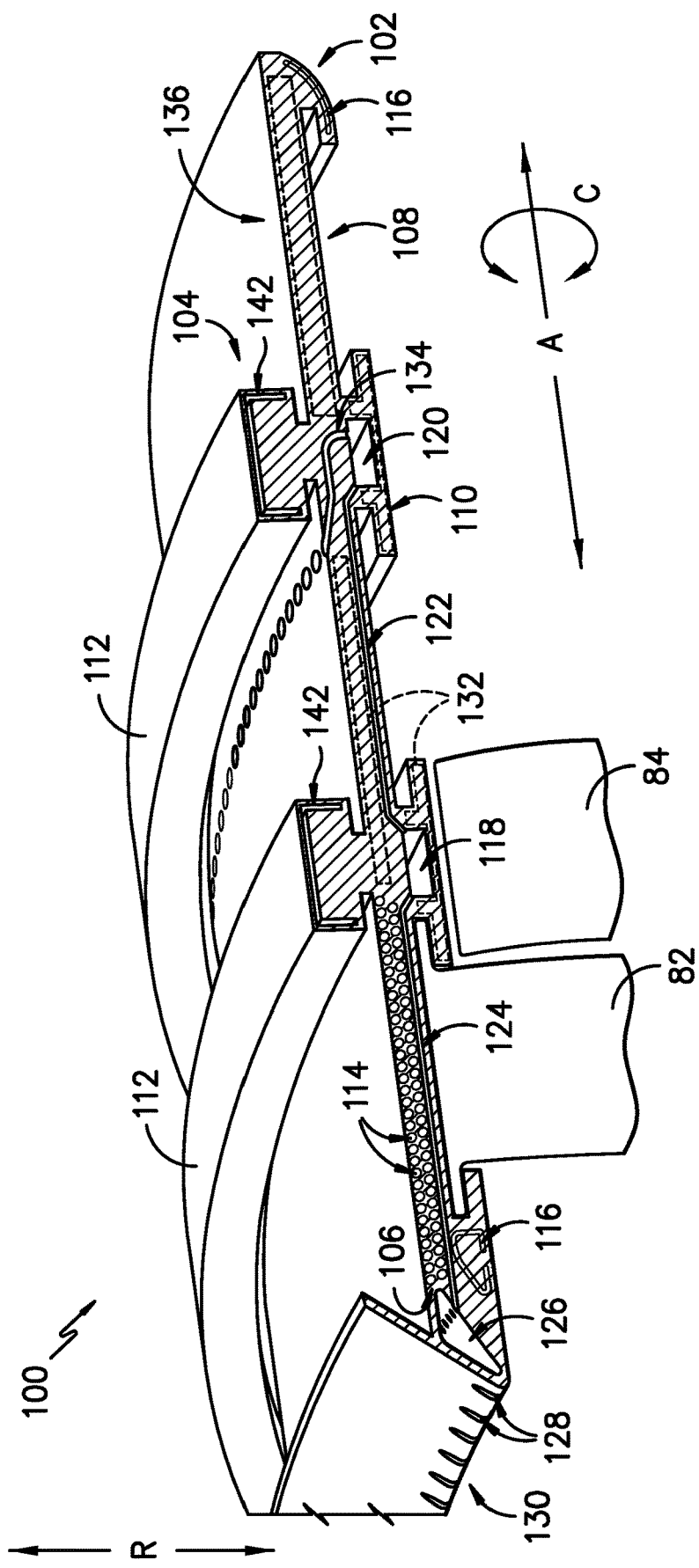
FIG. -2A-

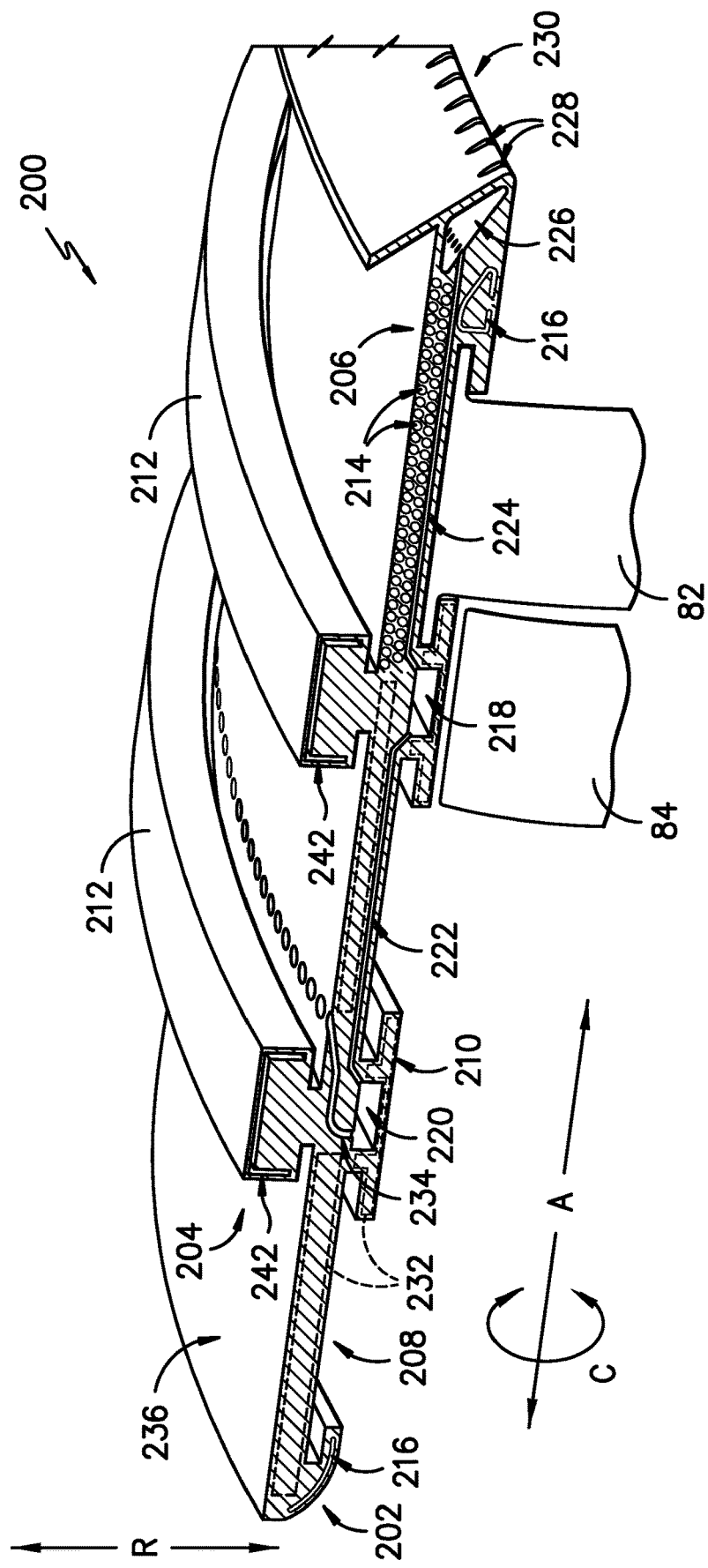
FIG. -2B-

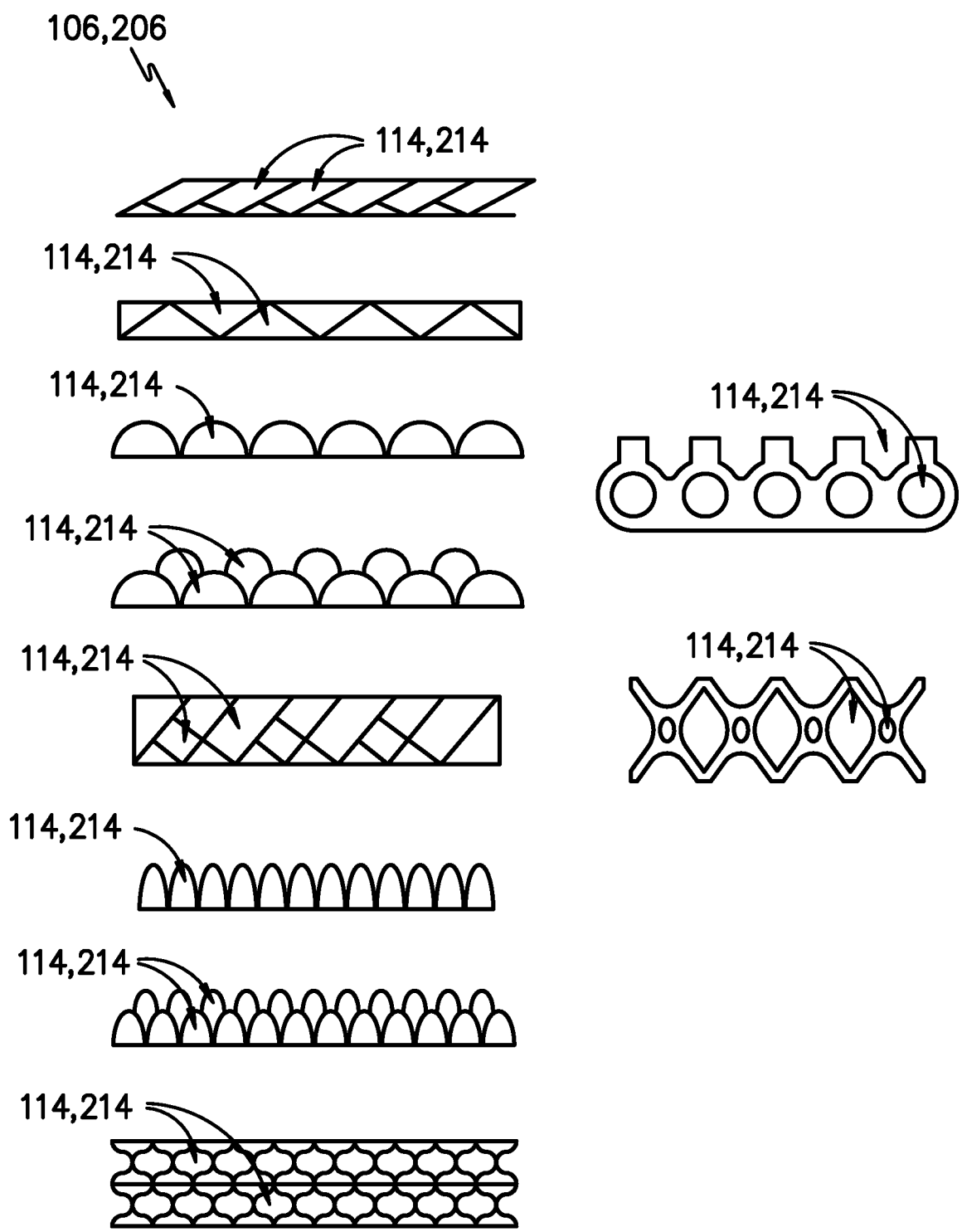
FIG. -3-

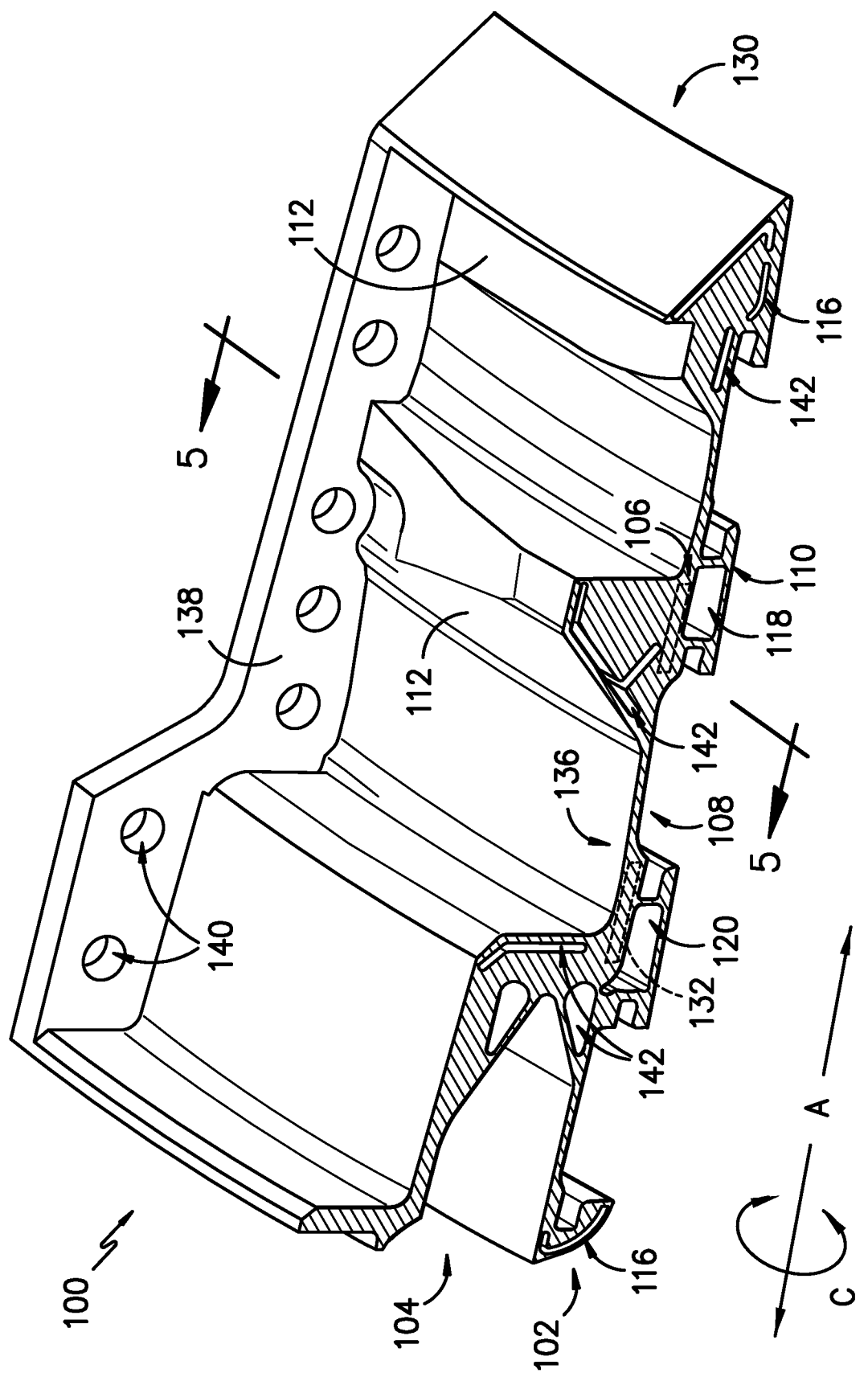
FIG. -4-

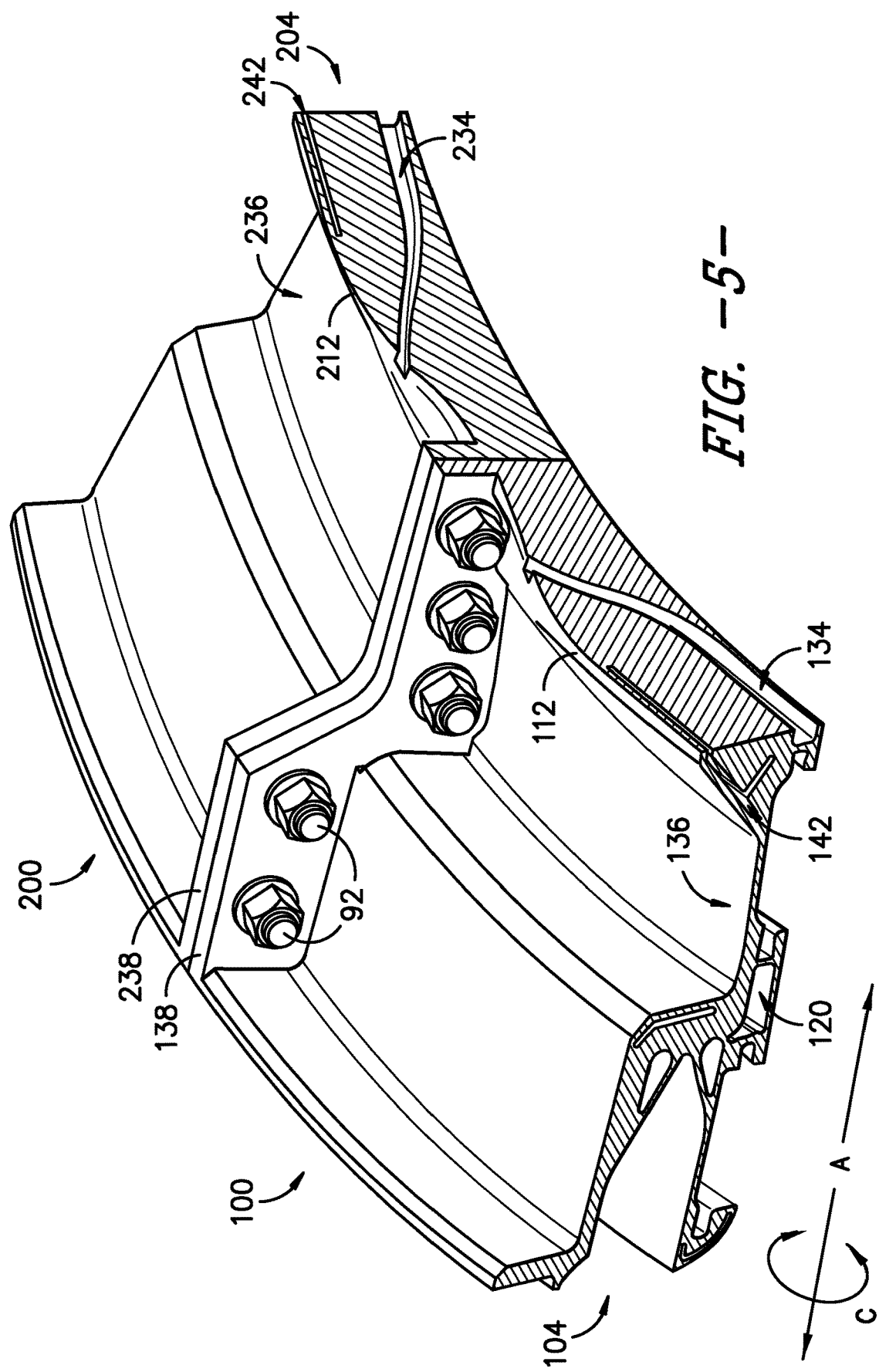
FIG. -5-

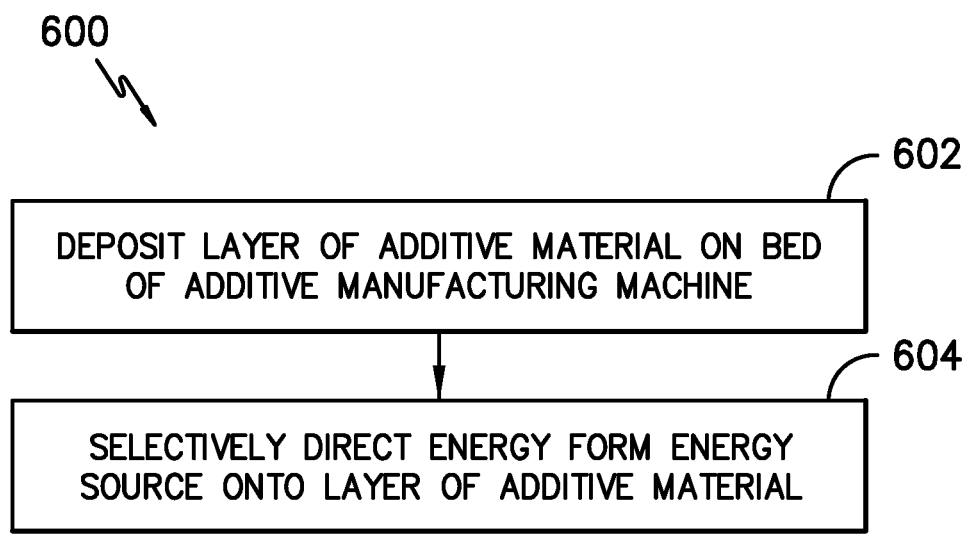
FIG. -6-

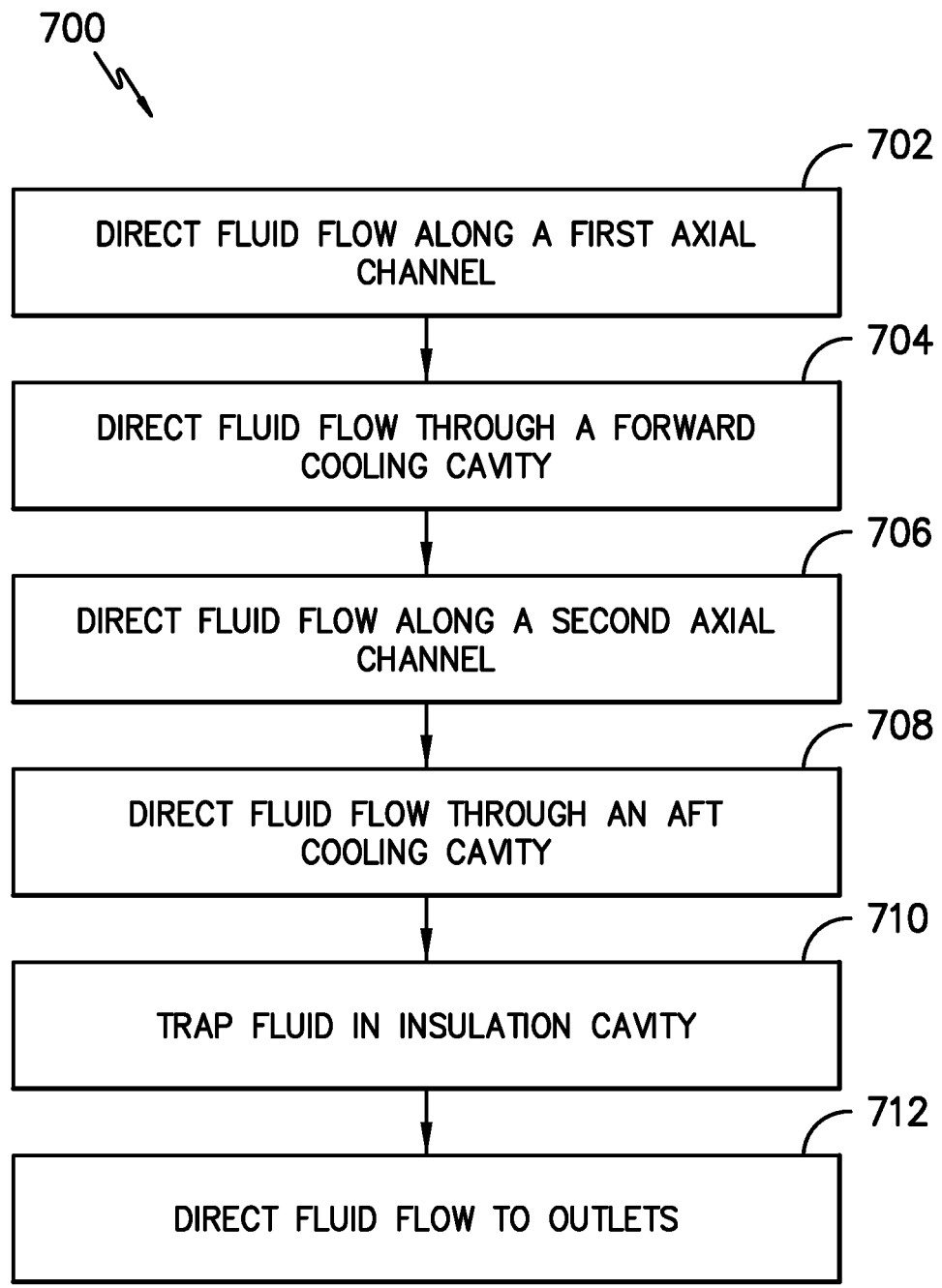
FIG. -7-

SPLIT CASINGS AND METHODS OF FORMING AND COOLING CASINGS

FIELD

The present subject matter relates generally to casings for gas turbine engines. More particularly, the present subject matter relates to split casings and methods of cooling casings of gas turbine engines.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Traditionally, the compressor section includes multiple stages of rotor and stator components, with one or more annular casings or ring cases surrounding the compressor stages. Such ring cases usually require an increased number of parts and increased assembly time compared to typical split case designs, which have been undesirable for compressor casings, particularly in latter or downstream compressor stages that experience increased temperatures compared to compressor inlet stages. For example, conventional split case designs have poorer clearances compared to ring case designs and can have undesirable leakage at the split joint. Accordingly, improvements to casings and methods, processes, and apparatus for forming and assembling gas turbine engine casings that help overcome these issues would be useful.

BRIEF DESCRIPTION

Aspects and advantages of the invention will be set forth in part in the following description, or may be obvious from the description, or may be learned through practice of the invention.

In one exemplary embodiment of the present subject matter, a compressor assembly of a gas turbine engine is provided. The compressor assembly comprises a compressor case including a first case segment and a second case segment. The first case segment extends along a circumferential direction over a first portion of a circumference of the compressor case. The first case segment comprises a first inner structure, a first outer structure, and a first porous structure defined between the first inner structure and the first outer structure. The second case segment extends along the circumferential direction over a second portion of the circumference of the compressor case. The second case segment comprises a second inner structure, a second outer structure, and a second porous structure defined between the second inner structure and the second outer structure. The first inner structure, the first outer structure, and the first porous structure are integrally formed as a first monolithic component. The second inner structure, the second outer structure, and the second porous structure are integrally formed as a second monolithic component.

In another exemplary embodiment of the present subject matter, a method of cooling a compressor case of a gas turbine engine is provided. The method comprises directing a fluid flow along a first axial channel; directing the fluid flow through a forward cooling cavity; directing the fluid flow along a second axial channel; and directing the fluid flow through an aft cooling cavity. The first axial channel, the forward cooling cavity, the second axial channel, and the aft cooling cavity are defined in a case segment formed by additive manufacturing. The compressor case is split such that the case segment defines a portion of the circumference of the compressor case.

In a further exemplary embodiment of the present subject matter, a structure for reducing a thermal gradient is provided. The structure comprises a first segment having a first inner surface and a first outer surface. The first segment defines a first raised portion extending radially outward from the first outer surface and defining a first internal cavity. The first segment further defines a first porous structure between the first inner surface and the first outer surface. The structure also comprises a second segment having a second inner surface and a second outer surface. The second segment defines a second raised portion extending radially outward from the second outer surface and defining a second internal cavity. The second segment further defines a second porous structure between the second inner surface and the second outer surface. Each of the first segment and the second segment is formed by an additive manufacturing process such that the first raised portion is integrally formed with the first porous structure and the second raised portion is integrally formed with the second porous structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2A provides a perspective cross-section view of a portion of a first case segment of a compressor case of a gas turbine engine, according to an exemplary embodiment of the present subject matter.

FIG. 2B provides a perspective cross-section view of a portion of a second case segment of the compressor case, according to an exemplary embodiment of the present subject matter.

FIG. 3 provides schematic cross-section views of various exemplary porous structures that may be defined in the first and second case segments, according to various embodiments of the present subject matter.

FIG. 4 provides a perspective cross-section view of a first case segment of the compressor case, according to another exemplary embodiment of the present subject matter.

FIG. 5 provides a partial cross-section view of the first case segment taken along the line 5-5 of FIG. 4, according to an exemplary embodiment of the present subject matter.

FIG. 6 provides a flow diagram illustrating a method of forming a compressor case of a gas turbine engine, according to an exemplary embodiment of the present subject matter.

FIG. 7 provides a flow diagram illustrating a method of cooling a structure such as a compressor case of a gas turbine engine, according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter is directed to structures for reducing thermal gradients. More particularly, the present subject matter is directed to structures, such as compressor casings for gas turbine engines, that incorporate one or more thermal management features. In exemplary embodiments, a compressor casing has a split case design, comprising a first case segment and a second case segment that each incorporate thermal management features such as a porous thermal break, cooling channels, and cooling cavities. The first and second case segments may each include a flange for joining together the case segments to form the compressor casing, e.g., using a plurality of attachment members extending through each flange. The present subject matter also is directed to cooling methods and methods of forming structures for reducing thermal gradients, such as compressor casings incorporating thermal management features, which includes additive manufacturing methods.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a circumferential direction C (extending about the longitudinal centerline 12 and the axial direction A), and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk or hub 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the compressor section and into the combustion section 26, where it is mixed with fuel and burned to provide combustion gases 66. More particularly, the compressor section includes the LP compressor 22 and the HP compressor 24 that each may comprise a plurality of compressor stages 80, with each stage 80 including both an annular array or circumferential row of stationary compressor vanes 82 (also referred to as compressor stator vanes 82) and an annular array or circumferential row of rotating compressor blades 84 (also referred to as compressor rotor blades 84) positioned immediately downstream of the compressor vanes 82. The plurality of compressor blades 84 in the LP compressor 22 are coupled to the LP shaft or spool 36, and the plurality of compressor blades in the HP compressor 24 are coupled to the HP shaft or spool 34. The plurality of compressor vanes 82 in the LP compressor 22 are coupled to a compressor casing, and the plurality of compressor vanes 82 in the HP compressor 24 are coupled to a compressor casing; at least a portion of the HP compressor vanes 82 are coupled to compressor casing 90. In some embodiments, the compressor casing 90 may extend through both the LP compressor 22 and the HP compressor 24 and support all of the compressor vanes 82. In other embodiments, the compressor casing 90 supports only a portion of the compressor vanes 82 and may support only a portion of the compressor vanes 82 in the HP compressor 24. As previously described, as the second portion of air 64 passes through the sequential stages of compressor vanes 82 and blades 84, the volume of air 64 is pressurized, i.e., the pressure of the air 64 is increased prior to combustion with fuel in the combustion section 26 to form the combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Referring to FIGS. 2A and 2B, perspective cross-section views are provided of portions of an annular compressor case 90 (FIG. 1), according to exemplary embodiments of the present subject matter. More particularly, FIG. 2A illustrates a portion of a first case segment 100, and FIG. 2B illustrates a portion of a second case segment 200. Together, the first case segment 100 and the second case segment 200 form the compressor case 90, which may be the outer casing for at least a portion of the plurality of sequential stages of compressor blades 84 and vanes 86 of the HP compressor 24. That is, the annular compressor case 90, which extends longitudinally along the axial direction A, may be axially split (i.e., split along the axial direction A) such that the first case segment 100 defines half a circumference of the compressor case 90 and the second case segment 200 defines the remaining half of the compressor case circumference. In some embodiments, the compressor case 90 could be divided into more than two case segments. As such, generally, the first case segment 100 extends along the circumferential direction C over a first portion of the circumference of the compressor case 90, and the second case segment 200 extends along the circumferential direction C over a second portion of the circumference of the compressor case 90. It will be appreciated that, in embodiments comprising only two case segments to form the compressor case 90, the two case segments may be mirror images of one another.

Referring particularly to FIG. 2A, in the depicted exemplary embodiment, the first case segment 100 comprises a first inner structure 102, a first outer structure 104, and a first porous structure 106 defined between the first inner structure 102 and the first outer structure 104. More particularly, the first inner structure 102, the first outer structure 104, and the first porous structure 106 are integrally formed as a single monolithic component, which may be referred to as the first monolithic component. The first inner structure 102 defines a plurality of first mounting areas 108 for attaching compressor vanes 82 to the first case segment 100. The first inner segment 102 also defines a first inner surface 110, which is positioned radially above the compressor blades 84 disposed within the compressor casing 90. A radial or clearance gap CL is defined between the blade tips 86 of the compressor blades 84 and the stationary first case segment 100. For ease of explanation, only one compressor vane 82 and only one compressor blade 84 are illustrated, but it will be appreciated that the compressor case 90 comprising the first case segment 100 may be disposed about two or more stages 80 of compressor vanes 82 and blades 84. Moreover, the first outer structure 104 defines a plurality of first raised portions 112, which increase the stiffness of the first case segment 100. The first raised portions 112 may incorporate one or more cooling features, as described in greater detail herein. Further, the first porous structure 106 is an architecture comprising a plurality of structural members with openings or spaces defined therebetween, which reduces the weight of the structure (e.g., because it is not solid material) while retaining the structural integrity of the structure.

Turning to FIG. 2B, in the illustrated exemplary embodiment, the second case segment 200 is configured in the same manner as the first case segment 100. More specifically, the second case segment 200 comprises a second inner structure 202, a second outer structure 204, and a second porous structure 206 defined between the second inner structure 202 and the second outer structure 104. The second inner structure 202, the second outer structure 204, and the second porous structure 206 are integrally formed as a single monolithic component, which may be referred to as the second monolithic component. The second inner structure 202 defines a plurality of second mounting areas 208 for attaching compressor vanes 82 to the second case segment 200. The second inner segment 202 also defines a second inner surface 210, which is positioned radially above the compressor blades 84 disposed within the compressor casing 90. The radial or clearance gap CL is defined between the blade tips 86 of the compressor blades 84 and the stationary second case segment 200. Like FIG. 2A, only one compressor vane 82 and only one compressor blade 84 are illustrated, but it will be appreciated that the compressor case 90 comprising the second case segment 200 may be disposed about two or more stages 80 of compressor vanes 82 and blades 84. Moreover, the second outer structure 204 defines a plurality of second raised portions 212, which increase the stiffness of the second case segment 200. The second raised portions 212 may incorporate one or more cooling features, as described in greater detail herein. Further, the second porous structure 206 is an architecture comprising a plurality of structural members with openings or spaces defined therebetween, which reduces the weight of the structure (e.g., because it is not solid material) while retaining the structural integrity of the structure.

As shown in FIGS. 2A and 2B, each case segment 100, 200 incorporates cooling features that, e.g., help reduce the thermal gradient of the compressor case 90 and/or lower the cooling requirement of the compressor case 90 while maintaining the clearance gap CL between the compressor case 90 and the compressor blades 84. For example, the porous structure 106, 206 defines a thermal break that disrupts and/or lengthens a thermal conduction path from a higher temperature area to a lower temperature area, thereby reducing a thermal gradient across the compressor case 90. The porous structure 106, 206 or thermal break may be a lattice or unit cell structure. For instance, each of the first porous structure 106 and second porous structure 206 may be an architecture comprising a network of nodes and beams arranged in one or more shapes. In an exemplary embodiment, each of the first porous structure 106 and the second porous structure 206 is a unit cell structure comprising a plurality of unit cells 114, 214, i.e., the first porous structure 106 comprises a plurality of first unit cells 114 and the second porous structure 206 comprises a plurality of second unit cells 214.

Referring to FIG. 3, various shapes or architectures for the first porous structure 106 and the second porous structure 206 are illustrated. For example, the porous structure 106, 206 may have a honeycomb, polygonal, or other shape or architecture. More particularly, as shown in FIG. 3, the porous structure 106, 206 may comprise a plurality of unit cells 114, 214 having a cross-sectional shape that is trapezoidal, triangular, semi-circular, a double ogee, etc. or a combination of two or more cross-sectional shapes.

Turning back to FIGS. 2A and 2B, as another cooling feature, the first case segment 100 further comprises at least one first air insulation cavity 116 extending along the circumferential direction C, and similarly, the second case segment 200 comprises at least one second air insulation cavity 216 extending along the circumferential direction C. Forward and aft air insulation cavities 116, 216 are illustrated in FIGS. 2A and 2B. The respective air insulation cavity 116, 216 is defined in the respective inner structure 102, 202, i.e., the first air insulation cavity 116 is defined in the first inner structure 102 and the second air insulation cavity 216 is defined in the second inner structure 202. Each air insulation cavity 116, 216 helps break the thermal conduction path across the compressor case 90, e.g., both radially and axially across the compressor case 90.

When positioned next to one another, e.g., when the first and second case segments 100, 200 are joined together, the forward air insulation cavities 116, 216 are aligned along the radial direction R, axial direction A, and circumferential direction C, and the aft air insulation cavities 116, 216 are aligned along the radial direction R, axial direction A, and circumferential direction C. In some embodiments, the aligned air insulation cavities 116, 216 form a single continuous, annular air insulation cavity. In other embodiments, one or both of the aligned air insulation cavities 116, 216 may be discontinuous along the circumferential direction C such that the aligned air insulation cavities 116, 216 form a circumferentially discontinuous air insulation cavity. In still other embodiments, one or both of the aligned air insulation cavities 116, 216 may define a wall or the like at the joint between the first and second case segments 100, 200 such that the aligned air insulation cavities 116, 216 form a circumferentially discontinuous air insulation cavity.

Keeping with FIGS. 2A and 2B, in the depicted exemplary embodiment, each case segment 100, 200 also includes cooling cavities for receipt of a flow of a cooling fluid F. More particularly, the first case segment 100 comprises a first forward cooling cavity 118 extending along the circumferential direction C and configured for receipt of the flow of the cooling fluid F. The second case segment 200 comprises a second forward cooling cavity 218 extending along the circumferential direction C and configured for receipt of the flow of the cooling fluid F. Further, the first case segment 100 comprises a first aft cooling cavity 120 extending along the circumferential direction C, and the second case segment 200 comprises a second aft cooling cavity 220 extending along the circumferential direction C. As shown in FIGS. 2A and 2B, the forward cooling cavities 118, 218 are each axially spaced apart from the aft cooling cavities 120, 220 with the forward cooling cavities 118, 218 defined axially forward of or at an upstream location relative to the aft cooling cavities 120, 220.

As further illustrated in FIGS. 2A and 2B, in an exemplary embodiment, a first passageway 122 fluidly connects the first forward cooling cavity 118 and the first aft cooling cavity 120. Further, a second passageway 222 fluidly connects the second forward cooling cavity 218 and the second aft cooling cavity 220. As such, the cooling fluid F can flow from the forward cooling cavities 118, 218 to the aft cooling cavities 120, 220. That is, with the passageways 122, 222 extending from the respective cooling cavities 118, 218, each of the first aft cooling cavity 120 and the second aft cooling cavity 220 is configured for receipt of the flow of the cooling fluid F. In some embodiments, a plurality of first passageways 122 extends from the first forward cooling cavity 118 to the first aft cooling cavity 120, and a plurality of second passageways 222 extends from the second forward cooling cavity 218 to the second aft cooling cavity 220. As shown in FIGS. 2A and 2B, each first passageway 122 and each second passageway 222 may be an axial channel for directing the flow of the cooling fluid F along the axial direction A from one cavity to another.

Like the air insulation cavities 116, 216, when positioned next to one another, e.g., when the first and second case segments 100, 200 are joined together, the first and second forward cavities 118, 218 are aligned along the radial direction R, axial direction A, and circumferential direction C, and the first and second aft cavities 120, 220 are aligned along the radial direction R, axial direction A, and circumferential direction C. In some embodiments, the aligned forward cavities 118, 218 form a single continuous, annular forward cavity, and the aligned aft cavities 120, 220 form a single continuous, annular aft cavity. In other embodiments, one or both forward cavities 118, 218 may be discontinuous along the circumferential direction C such that the aligned forward cavities 118, 218 form a circumferentially discontinuous forward cavity. Similarly, one or both aft cavities 120, 220 may be discontinuous along the circumferential direction C such that the aligned aft cavities 120, 220 form a circumferentially discontinuous aft cavity. In still other embodiments, one or both forward cavities 118, 218 and/or one or both aft cavities 120, 220 may define a wall or the like at the joint between the first and second case segments 100, 200 such that the aligned forward cavities 118, 218 form a circumferentially discontinuous forward cavity and/or the aligned aft cavities 120, 220 form a circumferentially discontinuous aft cavity. In further embodiments, the forward cavities 118, 218 may each be two halves of a single continuous, annular forward cavity and the aft cavities 120, 220 may each be two halves of a single continuous, annular aft cavity with first passageways 122 and second passageways 222 connecting the single forward cavity and the single aft cavity. As such, the forward cavities 118, 218 and aft cavities 120, 220 may all be connected so that the cooling fluid F flows through all of the cavities 118, 218, 120, 220.

In the illustrated embodiment, the first case segment 100 further comprises a first inlet passageway 124 extending from a first chamber 126 to the first forward cooling cavity 118, thereby fluidly connecting the first chamber 126 and the first forward cooling cavity 118. That is, each first inlet passageway 124 has an inlet defined in the first chamber 126 and an outlet defined in the first forward cooling cavity 118. More particularly, a plurality of first inlet passageways 124 extend from the first chamber 126, which is disposed axially forward of the first inlet passageways 124, to the first forward cooling cavity 118. Like the first passageways 122, each first inlet passageway 124 may be an axial channel for directing the flow of the cooling fluid F along the axial direction A from one cavity or chamber to another.

Further, a plurality of first inlet apertures 128 are defined along a first forward edge 130 of the first case segment 100 and are spaced apart from one another along the circumferential direction C. The first inlet apertures 128 open into the first chamber 126 that extends along the circumferential direction C, i.e., the first inlet apertures 128 extend from an external location to the first chamber 126. As such, the cooling fluid F may enter the first case segment 100 through the first inlet apertures 128 by flowing through the first inlet apertures 128 into the first chamber 126, flowing from the first chamber 126 into the first inlet passageway 124, and flowing from the first inlet passageway 124 into the first forward cooling cavity 118. From the first forward cooling cavity 118, the cooling fluid F may flow through the first passageway 122 into the first aft cooling cavity 120 as previously described.

Likewise, the second case segment 200 further comprises a second inlet passageway 224 extending from a second chamber 226 to the second forward cooling cavity 218, thereby fluidly connecting the second chamber 226 and the second forward cooling cavity 218. That is, each second inlet passageway 224 has an inlet defined in the second chamber 226 and an outlet defined in the second forward cooling cavity 218. More specifically, a plurality of second inlet passageways 224 extend from the second chamber 226, which is disposed axially forward of the second inlet passageways 224, to the second forward cooling cavity 218. Like the second passageways 222, each second inlet passageway 224 may be an axial channel for directing the flow of the cooling fluid F along the axial direction A from one cavity or chamber to another.

Moreover, a plurality of second inlet apertures 228 are defined along a second forward edge 230 of the second case segment 200 and are spaced apart from one another along the circumferential direction C. The second inlet apertures 228 open into the second chamber 226 that extends along the circumferential direction C, i.e., the second inlet apertures 228 extend from an external location to the second chamber 226. As such, the cooling fluid F may enter the second case segment 200 through the second inlet apertures 228 by flowing through the second inlet apertures 228 into the second chamber 226, flowing from the second chamber 226 into the second inlet passageway 224, and flowing from the second inlet passageway 224 into the second forward cooling cavity 218. From the second forward cooling cavity 218, the cooling fluid F may flow through the second passageway 222 into the second aft cooling cavity 220 as previously described.

As shown in FIGS. 2A and 2B, the first air insulation cavities 116, the first forward cooling cavity 118, and the first aft cooling cavity 120 are spaced apart from one another along the axial direction A, and the second air insulation cavity 216, the second forward cooling cavity 218, and the second aft cooling cavity 220 are spaced apart from one another along the axial direction A. In other embodiments, the air insulation cavities 116, 216 may be defined at other axial locations. For example, the first forward air insulation cavity 116 could be defined along the axial direction A between the forward cooling cavity 118 and the aft cooling cavity 120, or the first aft air insulation cavity 116 could be defined immediately downstream of the aft cooling cavity 120 (instead of at the extreme aft end of the first case segment 100 as illustrated in FIG. 2A).

Further, the air insulation cavities 116, 216 are not in fluid communication with the cooling cavities 118, 218, 120, 220. That is, the air insulation cavities 116, 216 are separate from the forward and aft cooling cavities 118, 218, 120, 220 such that the cooling fluid F does not flow through the air insulation cavities 116, 216. As such, any fluid flow within the air insulation cavities 116, 216 is induced flow, e.g., due to a difference in temperature in the fluid contained within the cavities 116, 216 in different locations within the cavities 116, 216.

As further illustrated in FIGS. 2A and 2B, the first and second case segments 100, 200 also may include one or more outlet passages extending from the respective aft cooling cavity to a location external to the compressor case 90. More particularly, in the depicted exemplary embodiment, the first case segment 100 comprises a plurality of first outlet passageways 134 that each extend from the first aft cooling cavity 120 to an outer surface 136 of the first case segment 100 defined by the first outer structure 104. That is, each first outlet passageway 134 has an inlet defined in the first aft cooling cavity 120 and an outlet defined in the first case segment outer surface 136. Similarly, in the illustrated exemplary embodiment, the second case segment 200 comprises a plurality of second outlet passageways 234 that each extend from the second aft cooling cavity 220 to an outer surface 236 of the second case segment 200 defined by the second outer structure 204, i.e., each second outlet passageway 234 has an inlet defined in the second aft cooling cavity 220 and an outlet defined in the second case segment outer surface 236. In other embodiments, the first outlet passageways 134 and/or the second outlet passageways 234 may vent to another location, such as engine air bleed or the like. In any event, the cooling fluid F, which may enter through the inlet apertures 128, 228 and flow through to the aft cooling cavities 120, 220 as described above, may exit the compressor case 90 through the outlet passageways 134, 234.

It will be appreciated that the cooling fluid F (disposed between the interior of the compressor case 90 and the exterior of the compressor case 90, which may be at different temperatures) may help reduce the thermal gradient across the compressor case 90. For example, the flow of the cooling fluid F can help reduce large or drastic temperature differences that may arise axially and/or radially along the compressor case 90. More specifically, flowing the cooling fluid F through the compressor case 90 can increase thermal transfer to the fluid F and thereby dissipate heat from the compressor case 90. Further, the cooling fluid F may provide a thermal break, e.g., by lengthening a thermal conduction path, that decreases heat conduction from the warmer compressor case interior to the cooler compressor case exterior. Moreover, by internally cooling the compressor case 90 as described herein, the clearance gap CL between the inner surface 110, 210 of each case segment 100, 200 and the compressor blades 84 can be maintained.

Although only one compressor vane 82 and one compressor blade 84 are illustrated, it will be appreciated from FIGS. 2A and 2B that the compressor case 90 formed from the first case segment 100 and the second case segment 200 circumferentially surrounds two or more stages of the plurality of compressor stages 80. That is, each of the first case segment 100 and the second case segment 200 has an axial length sufficient for the compressor case 90 to circumferential surround at least two compressor stages 80. Further, as depicted in FIGS. 2A and 2B, in exemplary embodiments, the forward cooling cavities 118, 218 and the aft cooling cavities 120, 220 are each positioned radially outward of a respective row of compressor blades 84 and are defined axially between respective rows of compressor vanes 82. Each of the passageways, i.e., the first and second passageways 122, 222 and the first and second inlet passageways 124, 224, extend along the axial direction A and a position radially outward of a respective row of compressor vanes 82. Thus, each passageway 122, 124, 222, 224 may be described as an axial channel or passageway defined radially outward from a respective row of compressor vanes 82.

Moreover, the porous structures 106, 206 disposed between the respective inner structure 102, 202 and outer structure 104, 204 is defined radially outward of a respective row of compressor vanes 82. Additional porous structure, e.g., a lattice or unit cell structure as described herein, may be defined at other areas of the first case segment 100 and/or second case segment 200, as indicated by the dashed boxes 132, 232. That is, each box 132 formed from dashed lines indicates an area of the first case segment 100 in which the first porous structure 106 may be defined, and each box 232 formed from dashed lines indicates an area of the second case segment 200 in which the second porous structure 206 may be defined. Porous structures 106, 206 may be defined in other areas as well.

Referring now to FIGS. 4 and 5, the first case segment 100 and the second case segment 200 may be joined together to form the compressor case 90. As illustrated in FIG. 4, the first case segment 100 comprises a first flange 138 extending along the axial direction A. The first flange 138 defines a plurality of first apertures 140. As shown in FIG. 5, the second case segment 200, which in the exemplary embodiment depicted herein is a mirror image of the first case segment 100, comprises a second flange 238 extending along the axial direction A. The second flange 238 defines a plurality of second apertures 240. As further illustrated in FIG. 5, the first flange 138 is positioned adjacent the second flange 238 to join together the first and second case segments 100, 200.

It will be appreciated that, although only one flange is depicted for each of the first case segment 100 and the second case segment 200, each case segment 100, 200 may comprise two flanges. That is, the compressor case 90 may be split along an axially extending plane such that the first and second case segments 100, 200 meet along two separate lengths extending longitudinally with respect to the compressor case 90 along the axial direction A. As such, each of the first case segment 100 and the second case segment 200 may include two of the respective flanges 138, 238, with one of the two flanges defined along the first length at which the case segments 100, 200 meet and the other of the two flanges defined along the second length at which the case segments 100, 200 meet.

As further illustrated in FIG. 5, a plurality of attachment members 92 secure the first case segment 100 to the second case segment 200. Each attachment member 92 of the plurality of attachment members 92 extends through a first aperture 140 of the plurality of first apertures 140 and a second aperture 240 of the plurality of second apertures 240. The attachment members 92 may be bolts, studs, or the like suitable for attaching the first case segment 100 to the second case segment 200. In the depicted exemplary embodiment, each attachment member 92 comprises a shaft 94 extending longitudinally along a direction orthogonal to the axial direction A and the centerline axis or axial centerline 12 of the engine 10. That is, each flange 138, 238 extends along the axial direction A such that the attachment members 92 positioned through the first and second apertures 140, 240 are perpendicular to the flanges 138, 238.

Each case segment 100, 200 also may include a flange-like or pseudo flange shape along the respective outer surface 136, 236, which may reduce the component stiffness at the first and second flanges 138, 238. More particularly, as shown in FIGS. 2A, 2B, 4, and 5, each of the first case segment 100 and the second case segment 200 comprises one or more raised portions 112, 212 defined by the respective outer structure 104, 204. That is, one or more raised portions 112 extends radially outward from the first outer surface 136 of the first case segment 100, and one or more raised portions 212 extends radially outward from the second outer surface 236 of the second case segment 200.

Each raised portion 112, 212 may define one or more internal cavities and/or passageways that receive a fluid such as air and form a thermal break between different portions of the case segment 100, 200. That is, the cavities and/or passageways defined within the raised portions 112, 212 break the thermal conduction path between an inner surface 110, 210 of the compressor case 90 and the outer surface 136, 236 of the compressor case 90. The raised portions 112, 212 may be described as having a pseudo flange shape and may reduce the stiffness of the respective case segment 100, 200 at the split in the compressor case 90, i.e., at the flanges 138, 238.

In the exemplary embodiment of FIG. 5, which illustrates a cross-section of an intermediate raised portion 112$i$ of the first case segment 100 taken along the line 5-5 in FIG. 4, the intermediate raised portion 112$i$ includes both an internal cavity 142 and a first outlet passageway 134, which extends from the first forward cooling cavity 118 rather than from the first aft cooling cavity 120 as illustrated in FIG. 2A. The internal cavity 142 may extend along the circumferential direction C and may have a different cross-sectional shape along the circumferential direction, as shown in a comparison of the internal cavity 142 in FIGS. 4 and 5.

Further, as illustrated by a comparison of FIGS. 2A and 4, the raised portions 112, 212 may have different shapes or configurations in different exemplary embodiments of the compressor case 90. For example, in FIGS. 2A and 2B, the raised portions 112, 212 of the first and second case segments 100, 200 have a generally T-shaped cross-section, with a generally U-shaped internal cavity 142. In FIGS. 4 and 5, the raised portions 112, 212 and internal cavities 142 each vary in cross-sectional shape along the circumferential direction C and each vary in cross-sectional shape from one raised portion 112, 212 to another raised portion 112, 212. For example, as depicted in FIG. 4, at a given circumferential location, a forward raised portion 112f has a different cross-sectional shape than the intermediate raised portion 112i, and the forward and intermediate raised portions 112f, 112i each have a different cross-sectional shape than an aft raised portion 112a. Further, the internal cavities 142 defined within each of the forward, intermediate, and aft raised portions 112f, 112i, 112a have different cross-sectional shapes from one another.

In some embodiments, the compressor case 90 is an aft compressor case 90 of the HP compressor 24, circumferentially surrounding two or more of the aft-most compressor stages 80, and the HP compressor 24 further comprises a forward compressor case 90 that circumferentially surrounds two or more compressor stages 80 upstream or forward of the aft compressor case 90. That is, the HP compressor 24 comprises two split compressor cases 90, e.g., disposed adjacent one another along the axial direction A such that the forward compressor case 90 is disposed axially forward of the aft compressor case 90. Further, a plurality of compressor stages 80 (each stage 80 comprising an annular array of compressor vanes 82 and an annular array of compressor blades 84) is disposed within each compressor case 90.

It will be appreciated that the forward compressor case 90 may be configured similar to the aft compressor case 90. That is, in exemplary embodiments, the forward compressor case 90 is an annular compressor case that extends longitudinally along the axial direction A and is axially split (i.e., split along the axial direction A) such that the forward compressor case 90 comprises a first case segment 100 and a second case segment 200 configured as described herein. More particularly, where the forward compressor case 90 comprises only two case segments, the two forward case segments may be mirror images of one another. As described herein, the first case segment 100 of the forward compressor case 90 may comprise a first inner structure 102, a first outer structure 104, and a first porous structure 106 defined between the first inner structure 102 and the first outer structure 104. The first inner structure 102, the first outer structure 104, and the first porous structure 106 of the first forward case segment 100 may be integrally formed as a single monolithic component (e.g., the first forward monolithic component). The first case segment 100 of the forward compressor case 90 may have other features, e.g., raised portions 112, cavities 116, 118, 120, 126, 142, passageways 122, 124, 134, and flange 138, as described herein. Similarly, the second case segment 200 of the forward compressor case 90 may be configured as described herein. For instance, the second case segment 200 of the forward compressor case 90 may comprise a second inner structure 202, a second outer structure 204, and a second porous structure 206 defined between the second inner structure 202 and the second outer structure 204. The second inner structure 202, the second outer structure 204, and the second porous structure 206 of the second forward case segment 200 may be integrally formed as a single monolithic component (e.g., the second forward monolithic component). Further, the second case segment 200 of the forward compressor case 90 may have other features, e.g., raised portions 212, cavities 216, 218, 220, 226, 242, passageways 222, 224, 234, and flange 238, as described herein.

In other embodiments, the HP compressor 24 may comprise one compressor case 90 that circumferentially surrounds all compressor stages 80 of the HP compressor 24. In such embodiments, the thermal management or cooling features of the case segments 100, 200 may be determined or sized based on the portion of the compressor case 90 that experiences the highest thermal gradient, or the thermal management or cooling features of the case segments 100, 200 may be tailored longitudinally along the compressor case 90, i.e., along the axial direction A. More particularly, different thermal management or cooling features may be used forward to aft along the compressor case 90. For example, more cooling may be needed in an aft section of the compressor case 90 compared to a forward section of the compressor case 90 because, e.g., temperatures within the compressor case 90 generally increase along the axial direction A and are higher in latter or downstream compressor stages 80 than in upstream compressor stages 80 (where upstream and downstream are relative to the flow of the second portion of air 64). Accordingly, additional and/or larger aft cavities 116, 120, 142, 216, 220, 242 and passageways 122, 134, 222, 234 may be used compared to the forward cavities 116, 118, 126, 142, 216, 218, 226, 242 and passageways 122, 124, 222, 224. As another example, the raised portions 112, 212 may be shaped differently in the forward section of the compressor case 90 compared to the raised portions 112, 212 in the aft section of the compressor case 90. The different shaped raised portions 112, 212 may accommodate the differences in size and/or number of cooling cavities and/or passageways between the forward and aft sections and/or may allow more thermal conduction in the aft section compared to the forward section by providing a different thermal conduction path as a result of the different shape of the raised portion 112, 212. Of course, other differences between forward and aft sections of the compressor case 90 may also be incorporated to optimize cooling of the case 90 based on the thermal gradient experienced in different sections of the case 90.

It will be understood that in configurations comprising separate adjacent compressor cases 90 rather than one single compressor case 90, the thermal management or cooling features may be tailored forward to aft. That is, the cooling features in the forward compressor case 90 may be different from the cooling features in the aft compressor case 90. For example, the aft compressor case 90 may be cooled more (e.g., using more and/or larger cooling features) than the forward compressor case 90 because the aft compressor case 90 may experience higher temperatures than the forward compressor case 90. As described above, the differences between the two compressor cases 90 may include additional and/or larger cavities 116, 118, 120, 126, 142, 216, 218, 220, 226, 242 and passageways 122, 124, 134, 222, 224, 234 in the aft compressor case 90 compared to the forward compressor case 90 and/or differently shaped raised portions 112, 212 in the aft compressor case 90 compared to the forward compressor case 90. Other differences between the forward and aft compressor cases 90 may also be incorporated to optimize cooling of the cases 90 based on the thermal gradient experienced by each case 90.

In still other embodiments, the HP compressor 24 may comprise one compressor case 90 that circumferentially surrounds two or more of the aftmost stages of the HP compressor 24 as well as one or more compressor casings having a different configuration, such as a ring case or the like, that circumferentially surrounds the upstream or forward stages 80 of the HP compressor 24. Of course, the compressor case 90 described herein also may be used in the LP compressor 22, and the split case configuration described herein further may be used in other sections of the turbofan engine 10, such as the HP turbine 28 and/or LP turbine 30.

As described herein, the present subject matter provides a structure, such as the compressor case 90, for reducing a thermal gradient. More particularly, the structure includes features such as raised portions or pseudo flanges with internal cavities and fluid passageways, as well as other channels, cavities, and passageways defined in the structure, to reduce thermal conductivity across the structure (e.g., radially across, axially across, and/or circumferentially about the structure). For example, the structure may extend longitudinally along an axial direction A and may include a first axial channel, a forward cooling cavity, a second axial channel, and an aft cooling cavity. A flow of a cooling fluid F may be directed through the first axial channel, the forward cooling cavity, the second axial channel, and the aft cooling cavity to help manage the thermal gradient experienced by the structure. One or more cavities for containing a fluid, such as the cooling fluid F, without promoting fluid flow between channels or cavities also may be included as thermal management features, e.g., providing a thermal break between warmer and cooler regions of the structure. Other features, such as a porous lattice or unit cell structure, also may be defined in the structure to provide a thermal break or to discourage thermal conduction between warmer and cooler regions.

In exemplary embodiments, the structure may be configured to break up a thermal mass such that a greater proportion of the thermal mass is experienced at a certain location with respect to the structure. For instance, the temperature of the HP compressor 24 (i.e., the temperature within the HP compressor 24) may be relatively consistent, but the external temperature may fluctuate between high and low extremes. A compressor case 90 having a split case configuration with multiple cooling features as described herein may break up the thermal mass such that a greater proportion of the thermal mass is located radially inboard of the compressor case 90.

In general, the exemplary embodiments of the compressor case 90 described herein may be manufactured or formed using any suitable process. However, in accordance with several aspects of the present subject matter, the compressor case 90 may be formed using an additive-manufacturing process, such as a 3D printing process. The use of such a process may allow each case segment 100, 200 of the compressor case 90 to be formed integrally, as a single monolithic component, or as any suitable number of subcomponents. In particular, the manufacturing process may allow each of the first case segment 100 and the second case segment 200 to be integrally formed and include a variety of features not possible when using prior manufacturing methods. For example, the additive manufacturing methods described herein enable the manufacture of compressor cases having any suitable size and shape with one or more configurations of internal cooling chambers or cavities, internal cooling passageways, and external raised portions, as well as other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers, unique pseudo flange geometries, tailored cooling cavity sizes and shapes, and/or tailored cooling fluid passageway numbers, shapes, and paths. As a specific example, using additive manufacturing methods such as those described herein, one or more case segments of a compressor case may be formed with uniquely shaped outer surface raised portions that define one or more cavities and/or one or more passageways therein. Further, the cross-sectional shape, number, and/or relative position of each cavity and passageway within a raised portion may vary among the raised portions of a case segment. In addition, although additive manufacturing enables manufacture of single monolithic components as describe herein from a single material, the additive manufacturing process also enables the manufacture of a single component having different materials such that different portions of the component may exhibit different performance characteristics. The successive, additive nature of the manufacturing process enables the construction of these novel features. As a result, the components described herein may exhibit improved performance and reliability.

It should be appreciated that the compressor case 90 formed from two case segments, the first case segment 100 and the second case segment 200, described herein is only for the purpose of explaining aspects of the present subject matter. For example, the compressor case 90 is used herein to describe exemplary configurations, constructions, and methods of manufacturing the compressor case 90. It should be appreciated that the additive manufacturing techniques discussed herein may be used to manufacture other casings or similar components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of the compressor case 90 according to exemplary embodiments of the present subject matter have been presented, an exemplary method 600 is provided for forming a compressor case segment according to an exemplary embodiment of the present subject matter. Method 600 can be used by a manufacturer to form two or more case segments 100, 200 and, thus, form the compressor case 90, or any other suitable casing. It should be appreciated that the exemplary method 600 is discussed herein only to describe exemplary aspects of the present subject matter and is not intended to be limiting.

Referring now to FIG. 6, method 600 includes, at block 602, depositing a layer of additive material on a bed of an additive manufacturing machine. Method 600 further includes, at block 604, selectively directing energy from an energy source onto the layer of additive material to fuse a portion of the additive material and form a case segment. For example, using the example from above, the case segment may be a first case segment 100 or a second case segment 200 of a compressor case 90 formed for a LP compressor 22 or a HP compressor 24 of the core turbine engine 16 of the turbofan jet engine 10.

The additively manufactured first case segment 100 may extend along a circumferential direction C and define a first portion of a circumference of the compressor case 90. The first case segment 100 may comprise a first inner structure 102, a first outer structure 104, and a first porous structure 106 defined between the first inner structure 102 and the first outer structure 104. Similarly, the additively manufactured second case segment 200 may extend along the circumferential direction C and define a second portion of the circumference of the compressor case 90. Further, the second case segment 200 may comprise a second inner structure 202, a second outer structure 204, and a second porous structure 206 defined between the second inner structure 202 and the second outer structure 204. Notably, the first inner structure 102, first outer structure 104, and first porous structure 106, are integrally formed during the additive manufacturing process such that the first inner structure 102, first outer structure 104, and first porous structure 106, are a single monolithic component, i.e., the first case segment 100 is a single monolithic component. Likewise, the second inner structure 202, second outer structure 204, and second porous structure 206, are integrally formed during the additive manufacturing process such that the second inner structure 202, second outer structure 204, and second porous structure 206, are a single monolithic component, i.e., the second case segment 200 is a single monolithic component. When attached to one another as described herein, the two monolithic case segments 100, 200 form the compressor case 90.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 600 are explained using the first and second case segments 100, 200 of the compressor case 90 as examples, it should be appreciated that these methods may be applied to manufacture any suitable casing. Additionally, although only an additive manufacturing method is described in detail herein, it will be understood that the first case segment 100, having an integral inner structure 102, outer structure 104, and porous structure 106, and the second case segment 200, having an integral inner structure 202, outer structure 204, and porous structure 206, can be formed by other suitable methods, such as casting in a suitable mold or the like.

The present subject matter also provides various cooling methods, e.g., methods of cooling a structure such as a compressor case 90. Referring now to FIG. 7, an exemplary cooling method 700 is illustrated, according to an exemplary embodiment of the present subject matter. As shown at block 702, the method 700 includes directing a fluid flow along a first axial channel, such as the inlet passageways 124, 224. As described herein, the fluid flow may be a flow of a cooling fluid F, such as air or the like. The method 700 further includes, as illustrated at block 704, directing the fluid flow through a forward cooling cavity, such as the forward cooling cavities 118, 218. Moreover, as shown at blocks 706 and 708, the method 700 may include directing the fluid flow along a second axial channel, such as the passageways 122, 222, and then directing the fluid flow through an aft cooling cavity, such as the aft cooling cavities 120, 220. Thus, an exemplary cooling method 700 may comprise flowing a cooling fluid F along the passageways and through the cooling cavities described herein with respect to the exemplary first case segment 100 and second case segment 200, which together form an exemplary compressor case 90.

The cooling method 700 may include other features as well. For example, as shown at block 710, the exemplary cooling method 700 may include trapping a portion of the cooling fluid F in an insulation cavity, such as the air insulation cavities 116, 216 and/or the internal cavities 142, 242. As described herein, the trapped fluid, i.e., the fluid in the air insulation cavities 116, 216 and the internal cavities 142, 242, does not flow from one cavity to another but, rather, is maintained in the respective cavity 116, 142, 216, 242 to provide a thermal break, e.g., between the warmer inner surface 110, 210 to the cooler outer surface 136, 236 of the respective case segment 100, 200. Further, as described herein, the cooling fluid F flowing through the passageways 122, 124, 222, 224 and cavities 118, 120, 218, 220 enters and exits its cooling flowpath through the respective case segment 100, 200. Thus, the method 700 may also include directing the cooling fluid F from inlet apertures 128, 228 through the passageways 122, 124, 134, 222, 224, 234 and cavities 118, 120, 126, 218, 220, 226 to outlets defined by the outlet passageways 134, 234, as shown at block 712. As described herein, the cooling fluid F may exit to bypass flow, secondary flow, etc., i.e., to a location external to the compressor case 90.

Accordingly, the present subject matter is directed to structures for reducing thermal gradients, which can include casings such as compressor casings of gas turbine engines, as well as cooling methods and methods of forming and assembling casings. The present subject matter addresses, at least in part, assembly challenges and thermal management challenges posed by, e.g., known casing designs, by allowing a split case design without requiring various materials for thermal management, which can decrease part count, reduce cost, simplify supply chain, and/or improve specific fuel consumption (SFC).

As described herein, splitting an annular structure into non-annular portions that each incorporate one or more cooling features may reduce or slow thermal growth of the structure. For example, a porous thermal break, such as a lattice or unit cell thermal break, incorporated into each non-annular portion of the annular structure may reduce heat conduction through the structure, which in turn may allow less cooling flow to be supplied to the structure to cool the structure. Further, for embodiments in which the annular structure is a compressor case, the split case configuration described herein may improve clearance control, e.g., with respect to the compressor blades disposed within the compressor case, particularly compared to typical ring case compressor designs. Thus, the present subject matter is directed to a uniquely shaped structure that can optimally break a thermal conduction path. The unique shape of the structure may be achieved using additive manufacturing, which enables integration of the thermal break and cooling cavities and/or passageways within a single monolithic component. Improved cooling of the structure with less cooling flow can improve SFC of a gas turbine engine incorporating such structure and/or reduce the cost of manufacturing and supply chain over the life cycle of the structure, for example, by reducing variation in material throughout the structure compared to current designs (e.g., from two or more different materials in known compressor ring case designs to a single material). Other benefits and advantages of the present subject matter may be realized as well.

Further aspects of the invention are provided by the subject matter of the following clauses:

1. A compressor assembly of a gas turbine engine comprising a compressor case including a first case segment extending along a circumferential direction over a first portion of a circumference of the compressor case, the first case segment comprising a first inner structure, a first outer structure, and a first porous structure defined between the first inner structure and the first outer structure, and a second case segment extending along the circumferential direction over a second portion of the circumference of the compressor case, the second case segment comprising a second inner structure, a second outer structure, and a second porous structure defined between the second inner structure and the second outer structure, wherein the first inner structure, the first outer structure, and the first porous structure are integrally formed as a first monolithic component, and wherein the second inner structure, the second outer structure, and the second porous structure are integrally formed as a second monolithic component.

2. The compressor assembly of any preceding clause, wherein the first case segment further comprises a first air insulation cavity extending along the circumferential direction, and wherein the second case segment further comprises a second air insulation cavity extending along the circumferential direction.

3. The compressor assembly of any preceding clause, wherein the first case segment further comprises a first cooling cavity extending along the circumferential direction, wherein the first cooling cavity is configured for receipt of a flow of a cooling fluid, wherein the second case segment further comprises a second cooling cavity extending along the circumferential direction, wherein the second cooling cavity is configured for receipt of the flow of the cooling fluid.

4. The compressor assembly of any preceding clause, wherein the first cooling cavity is a first forward cooling cavity and the first case segment further comprises a first aft cooling cavity, wherein a first passageway fluidly connects the first forward cooling cavity and the first aft cooling cavity, wherein the second cooling cavity is a second forward cooling cavity and the second case segment further comprises a second aft cooling cavity, and wherein a second passageway fluidly connects the second forward cooling cavity and the second aft cooling cavity.

5. The compressor assembly of any preceding clause, wherein the first case segment further comprises a first air insulation cavity extending along the circumferential direction, wherein the first air insulation cavity, the first forward cooling cavity, and the first aft cooling cavity are spaced apart from one another along an axial direction, wherein the second case segment further comprises a second air insulation cavity extending along the circumferential direction, and wherein the second air insulation cavity, the second forward cooling cavity, and the second aft cooling cavity are spaced apart from one another along the axial direction.

6. The compressor assembly of any preceding clause, wherein the first case segment further comprises a first inlet passageway and a first chamber, the first chamber disposed axially forward of the first inlet passageway, the first inlet passageway extending from the first chamber to the first forward cooling cavity, and wherein the second case segment further comprises a second inlet passageway and a second chamber, the second chamber disposed axially forward of the second inlet passageway, the second inlet passageway extending from the second chamber to the second forward cooling cavity.

7. The compressor assembly of any preceding clause, wherein the first case segment comprises a first raised portion extending radially outward from a first outer surface of the first outer structure, the first raised portion defining a first internal cavity therein, and wherein the second case segment comprises a second raised portion extending radially outward from a second outer surface of the second outer structure, the second raised portion defining a second internal cavity therein.

8. The compressor assembly of any preceding clause, further comprising a plurality of compressor blades arranged in circumferential rows; a plurality of compressor vanes arranged in circumferential rows; and a plurality of compressor stages, each stage comprising a circumferential row of compressor blades positioned immediately downstream of a circumferential row of compressor vanes, and wherein the compressor case circumferentially surrounds two or more compressor stages of the plurality of compressor stages.

9. The compressor assembly of any preceding clause, wherein the first case segment defines a first cooling cavity that is positioned radially outward from a row of compressor blades, and wherein the second case segment defines a second cooling cavity that is positioned radially outward from the row of compressor blades.

10. The compressor assembly of any preceding clause, wherein the first porous structure is defined radially outward from a row of compressor vanes, and wherein the second porous structure is defined radially outward from the row of compressor vanes.

11. The compressor assembly of any preceding clause, wherein the compressor case is a forward compressor case, further comprising an aft compressor case including a first aft case segment extending over a first portion of a circumference of the aft compressor case, the first aft case segment comprising a first aft inner structure, a first aft outer structure, and a first aft porous structure defined between the first aft inner structure and the first aft outer structure, the first aft inner structure, the first aft outer structure, and the first aft porous structure integrally formed as a first aft monolithic component, and a second aft case segment extending over a second portion of the circumference of the aft compressor case, the second aft case segment comprising a second aft inner structure, a second aft outer structure, and a second aft porous structure defined between the second aft inner structure and the second aft outer structure, the second aft inner structure, the second aft outer structure, and the second aft porous structure integrally formed as a second aft monolithic component, wherein the aft compressor case is disposed axially aft of the forward compressor case, and wherein the aft compressor case circumferentially surrounds two or more compressor stages of the plurality of compressor stages.

12. The compressor assembly of any preceding clause, wherein the first case segment further comprises a first flange extending along an axial direction, the first flange defining a plurality of first inlet apertures, wherein the second case segment further comprises a second flange extending along the axial direction, the second flange defining a plurality of second inlet apertures, and wherein the first flange is positioned adjacent the second flange.

13. The compressor assembly of any preceding clause, further comprising a plurality of attachment members securing the first case segment to the second case segment, wherein each attachment member of the plurality of attachment members extends through a first inlet aperture of the plurality of first inlet apertures and a second inlet aperture of the plurality of second inlet apertures.

14. The compressor assembly of any preceding clause, wherein each attachment member of the plurality of attachment members comprises a shaft extending longitudinally along a direction orthogonal to a centerline axis of the gas turbine engine.

15. The compressor assembly of any preceding clause, wherein each of the first case segment and the second case segment comprises a plurality of layers formed by depositing a layer of additive material on a bed of an additive manufacturing machine; and selectively directing energy from an energy source onto the layer of additive material to fuse a portion of the additive material.

16. A method of cooling a compressor case of a gas turbine engine comprising directing a fluid flow along a first axial channel; directing the fluid flow through a forward cooling cavity; directing the fluid flow along a second axial channel; and directing the fluid flow through an aft cooling cavity, wherein the first axial channel, the forward cooling cavity, the second axial channel, and the aft cooling cavity are defined in a case segment formed by additive manufacturing, and wherein the compressor case is split such that the case segment defines a portion of the circumference of the compressor case.

17. The method of any preceding clause, wherein the case segment comprises an inner structure, an outer structure, and a porous structure that are integrally formed by additive manufacturing as a single monolithic component.

18. The method of any preceding clause, further comprising directing the fluid flow from the aft cooling cavity to a location external to the compressor case.

19. The method of any preceding clause, further comprising trapping a portion of the cooling fluid in an insulation cavity.

20. The method of any preceding clause, wherein the case segment is a first case segment and the compressor case further comprises a second case segment, the method further comprising directing a fluid flow along a first axial channel defined in the second case segment; directing the fluid flow through a forward cooling cavity defined in the second case segment; directing the fluid flow along a second axial channel defined in the second case segment; and directing the fluid flow through an aft cooling cavity defined in the second case segment, wherein the second case segment is formed by additive manufacturing, and wherein the second case segment defines a second portion of the circumference of the compressor case.

21. A structure for reducing a thermal gradient comprising a first segment having a first inner surface and a first outer surface, the first segment defining a first raised portion extending radially outward from the first outer surface, the first raised portion defining a first internal cavity, and a first porous structure between the first inner surface and the first outer surface; and a second segment having a second inner surface and a second outer surface, the second segment defining a second raised portion extending radially outward from the second outer surface, the second raised portion defining a second internal cavity, and a second porous structure between the second inner surface and the second outer surface, wherein each of the first segment and the second segment is formed by an additive manufacturing process such that the first raised portion is integrally formed with the first porous structure and the second raised portion is integrally formed with the second porous structure.

22. The structure of any preceding clause, wherein the first segment defines a first plurality of cavities in fluid communication with the first internal cavity to direct a fluid flow through the first segment.

23. The structure of any preceding clause, wherein the second segment defines a second plurality of cavities in fluid communication with the second internal cavity to direct a fluid flow through the second segment.

24. The structure of any preceding clause, wherein each of the first segment and the second segment defines a flange, and wherein a plurality of attachment members extend through the flange of each of the first segment and the second segment to attach the first segment to the second segment.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A compressor assembly of a gas turbine engine, comprising:
   a compressor case including a first case segment extending along a circumferential direction over a first portion of a circumference of the compressor case, the first case segment comprising a first inner structure, a first outer structure, and a first porous structure defined between the first inner structure and the first outer structure, and
   a second case segment extending along the circumferential direction over a second portion of the circumference of the compressor case, the second case segment comprising a second inner structure, a second outer structure, and a second porous structure defined between the second inner structure and the second outer structure,
   wherein the first inner structure, the first outer structure, and the first porous structure are integrally formed as a first monolithic component,
   wherein the second inner structure, the second outer structure, and the second porous structure are integrally formed as a second monolithic component,
   wherein the first case segment further comprises a first air insulation cavity extending along the circumferential direction, and wherein the second case segment further comprises a second air insulation cavity extending along the circumferential direction.

2. The compressor assembly of claim 1, wherein the first case segment further comprises a first cooling cavity extending along the circumferential direction, wherein the first cooling cavity is configured for receipt of a flow of a cooling fluid, wherein the second case segment further comprises a second cooling cavity extending along the circumferential direction, wherein the second cooling cavity is configured for receipt of the flow of the cooling fluid.

3. The compressor assembly of claim 2, wherein the first cooling cavity is a first forward cooling cavity and the first case segment further comprises a first aft cooling cavity, wherein a first passageway fluidly connects the first forward cooling cavity and the first aft cooling cavity, wherein the second cooling cavity is a second forward cooling cavity and the second case segment further comprises a second aft cooling cavity, and wherein a second passageway fluidly connects the second forward cooling cavity and the second aft cooling cavity.

4. The compressor assembly of claim 3, wherein the first case segment further comprises a first air insulation cavity extending along the circumferential direction, wherein the first air insulation cavity, the first forward cooling cavity, and the first aft cooling cavity are spaced apart from one another along an axial direction, wherein the second case segment further comprises a second air insulation cavity extending along the circumferential direction, and wherein the second air insulation cavity, the second forward cooling cavity, and the second aft cooling cavity are spaced apart from one another along the axial direction.

5. The compressor assembly of claim 3, wherein the first case segment further comprises a first inlet passageway and a first chamber, the first chamber disposed axially forward of the first inlet passageway, the first inlet passageway extending from the first chamber to the first forward cooling cavity, and wherein the second case segment further comprises a second inlet passageway and a second chamber, the second chamber disposed axially forward of the second inlet passageway, the second inlet passageway extending from the second chamber to the second forward cooling cavity.

6. The compressor assembly of claim 1, wherein the first case segment comprises a first raised portion extending radially outward from a first outer surface of the first outer structure, the first raised portion defining a first internal cavity therein, and wherein the second case segment comprises a second raised portion extending radially outward from a second outer surface of the second outer structure, the second raised portion defining a second internal cavity therein.

7. The compressor assembly of claim 1, further comprising:
   a plurality of compressor blades arranged in circumferential rows;
   a plurality of compressor vanes arranged in circumferential rows; and
   a plurality of compressor stages, each stage comprising a circumferential row of compressor blades positioned immediately downstream of a circumferential row of compressor vanes, and
   wherein the compressor case circumferentially surrounds two or more compressor stages of the plurality of compressor stages.

8. The compressor assembly of claim 7, wherein the first case segment defines a first cooling cavity that is positioned radially outward from a row of compressor blades, and wherein the second case segment defines a second cooling cavity that is positioned radially outward from the row of compressor blades.

9. The compressor assembly of claim 7, wherein the first porous structure is defined radially outward from a row of compressor vanes, and wherein the second porous structure is defined radially outward from the row of compressor vanes.

10. The compressor assembly of claim 7, wherein the compressor case is a forward compressor case, further comprising:
   an aft compressor case including
      a first aft case segment extending over a first portion of a circumference of the aft compressor case, the first aft case segment comprising a first aft inner structure, a first aft outer structure, and a first aft porous structure defined between the first aft inner structure and the first aft outer structure, the first aft inner structure, the first aft outer structure, and the first aft porous structure integrally formed as a first aft monolithic component, and
      a second aft case segment extending over a second portion of the circumference of the aft compressor case, the second aft case segment comprising a second aft inner structure, a second aft outer structure, and a second aft porous structure defined between the second aft inner structure and the second aft outer structure, the second aft inner structure, the second aft outer structure, and the second aft porous structure integrally formed as a second aft monolithic component,
   wherein the aft compressor case is disposed axially aft of the forward compressor case, and wherein the aft compressor case circumferentially surrounds two or more compressor stages of the plurality of compressor stages.

11. The compressor assembly of claim 1, wherein the first case segment further comprises a first flange extending along an axial direction, the first flange defining a plurality of first inlet apertures, wherein the second case segment further comprises a second flange extending along the axial direction, the second flange defining a plurality of second inlet apertures, and wherein the first flange is positioned adjacent the second flange.

12. The compressor assembly of claim 11, further comprising:
a plurality of attachment members securing the first case segment to the second case segment,
wherein each attachment member of the plurality of attachment members extends through a first inlet aperture of the plurality of first inlet apertures and a second inlet aperture of the plurality of second inlet apertures.

13. The compressor assembly of claim 12, wherein each attachment member of the plurality of attachment members comprises a shaft extending longitudinally along a direction orthogonal to a centerline axis of the gas turbine engine.

14. The compressor assembly of claim 1, wherein each of the first case segment and the second case segment comprises a plurality of layers formed by:
depositing a layer of additive material on a bed of an additive manufacturing machine; and
selectively directing energy from an energy source onto the layer of additive material to fuse a portion of the additive material.

15. A compressor assembly of a gas turbine engine, comprising:
a compressor case including a first case segment extending along a circumferential direction over a first portion of a circumference of the compressor case, the first case segment comprising a first inner structure, a first outer structure, and a first porous structure defined between the first inner structure and the first outer structure, and
a second case segment extending along the circumferential direction over a second portion of the circumference of the compressor case, the second case segment comprising a second inner structure, a second outer structure, and a second porous structure defined between the second inner structure and the second outer structure,
wherein the first inner structure, the first outer structure, and the first porous structure are integrally formed as a first monolithic component, and
wherein the second inner structure, the second outer structure, and the second porous structure are integrally formed as a second monolithic component,
wherein the first case segment further comprises a first cooling cavity extending along the circumferential direction, wherein the first cooling cavity is configured for receipt of a flow of a cooling fluid, wherein the second case segment further comprises a second cooling cavity extending along the circumferential direction, wherein the second cooling cavity is configured for receipt of the flow of the cooling fluid.

16. The compressor assembly of claim 15, wherein the first cooling cavity is a first forward cooling cavity and the first case segment further comprises a first aft cooling cavity, wherein a first passageway fluidly connects the first forward cooling cavity and the first aft cooling cavity, wherein the second cooling cavity is a second forward cooling cavity and the second case segment further comprises a second aft cooling cavity, and wherein a second passageway fluidly connects the second forward cooling cavity and the second aft cooling cavity.

17. The compressor assembly of claim 16, wherein the first case segment further comprises a first air insulation cavity extending along the circumferential direction, wherein the first air insulation cavity, the first forward cooling cavity, and the first aft cooling cavity are spaced apart from one another along an axial direction, wherein the second case segment further comprises a second air insulation cavity extending along the circumferential direction, and wherein the second air insulation cavity, the second forward cooling cavity, and the second aft cooling cavity are spaced apart from one another along the axial direction.

18. The compressor assembly of claim 16, wherein the first case segment further comprises a first inlet passageway and a first chamber, the first chamber disposed axially forward of the first inlet passageway, the first inlet passageway extending from the first chamber to the first forward cooling cavity, and wherein the second case segment further comprises a second inlet passageway and a second chamber, the second chamber disposed axially forward of the second inlet passageway, the second inlet passageway extending from the second chamber to the second forward cooling cavity.

19. A compressor assembly of a gas turbine engine, comprising:
a compressor case including a first case segment extending along a circumferential direction over a first portion of a circumference of the compressor case, the first case segment comprising a first inner structure, a first outer structure, and a first porous structure defined between the first inner structure and the first outer structure, and
a second case segment extending along the circumferential direction over a second portion of the circumference of the compressor case, the second case segment comprising a second inner structure, a second outer structure, and a second porous structure defined between the second inner structure and the second outer structure,
wherein the first inner structure, the first outer structure, and the first porous structure are integrally formed as a first monolithic component, and
wherein the second inner structure, the second outer structure, and the second porous structure are integrally formed as a second monolithic component,
wherein the first case segment comprises a first raised portion extending radially outward from a first outer surface of the first outer structure, the first raised portion defining a first internal cavity therein, and wherein the second case segment comprises a second raised portion extending radially outward from a second outer surface of the second outer structure, the second raised portion defining a second internal cavity therein.

* * * * *